(12) United States Patent
Nunome

(10) Patent No.: US 8,701,445 B2
(45) Date of Patent: Apr. 22, 2014

(54) OPTICAL FIBER MANUFACTURING APPARATUS AND OPTICAL FIBER MANUFACTURING METHOD

(75) Inventor: Tomohiro Nunome, Sakura (JP)

(73) Assignee: Fujikura Ltd., Tokyo (JP)

( * ) Notice: Subject to any disclaimer, the term of this patent is extended or adjusted under 35 U.S.C. 154(b) by 173 days.

(21) Appl. No.: 12/631,676

(22) Filed: Dec. 4, 2009

(65) Prior Publication Data

US 2010/0139323 A1    Jun. 10, 2010

(30) Foreign Application Priority Data

Dec. 5, 2008 (JP) .................................. 2008-311219

(51) Int. Cl.
*C03B 37/02* (2006.01)
(52) U.S. Cl.
USPC .................................. 65/435; 65/475; 65/477
(58) Field of Classification Search
USPC ................................................ 65/435, 475, 477
See application file for complete search history.

(56) References Cited

U.S. PATENT DOCUMENTS

| | | | | |
|---|---|---|---|---|
| 4,174,842 A | * | 11/1979 | Partus | 277/431 |
| 4,969,501 A | * | 11/1990 | Brokloff et al. | 164/122.1 |
| 2006/0280578 A1 | | 12/2006 | Shiono | |

FOREIGN PATENT DOCUMENTS

| | | |
|---|---|---|
| CN | 1341081 A | 3/2002 |
| CN | 1557755 A | 12/2004 |
| DE | 3903466 A1 | 8/1990 |
| JP | 62-246837 A | 10/1987 |
| JP | 10-500761 A | 1/1998 |
| JP | 2003-183045 A | 7/2003 |
| JP | 2005-008475 A | 1/2005 |
| JP | 2005-206443 A | 8/2005 |
| JP | 2006-248842 A | 9/2006 |
| JP | 2006-342030 A | 12/2006 |
| JP | 2007-070187 A | 3/2007 |
| JP | 2007-070189 A | 3/2007 |
| WO | 9628672 A1 | 9/1996 |

OTHER PUBLICATIONS

Notice of Allowance issued by Chinese Patent Office in Chinese Patent Application 200910246094.X dated Jul. 8, 2013.
Office Action issued by Japanese Patent Office in Japanese Application No. 2008-311219 dated Oct. 16, 2012.

* cited by examiner

*Primary Examiner* — Queenie Dehghan
(74) *Attorney, Agent, or Firm* — Sughrue Mion, PLLC

(57) ABSTRACT

An optical fiber manufacturing apparatus for manufacturing an optical fiber by drawing a optical fiber preform, including: a drawing furnace having therein a muffle tube into which the optical fiber preform is inserted and heating the optical fiber preform; and a first seal member which is disposed at an insert side of the drawing furnace so as to be coaxial with the drawing furnace and which seals the optical fiber preform inserted into an opening formed at the center thereof, wherein the first seal member includes a plurality of inner-circumference slits formed in the inner circumference thereof and a plurality of outer-circumference slits formed in the outer circumference thereof.

6 Claims, 6 Drawing Sheets

OPTICAL FIBER MANUFACTURING APPARATUS AND OPTICAL FIBER MANUFACTURING METHOD

BACKGROUND OF THE INVENTION

1. Field of the Invention

The present invention relates to an optical fiber manufacturing apparatus and an optical fiber manufacturing method which can be suitably used in an optical fiber drawing process using a rod-in-tube method.

Priority is claimed on Japanese Patent Application No. 2008-311219 filed Dec. 5, 2008, the contents of which are incorporated herein by reference.

2. Description of the Related Art

A method of sintering and vitrifying a porous silica preform produced by a soot method such as a VAD method or an OVD method is generally used in manufacturing an optical fiber. However, with the recent increase in size of the optical fiber preform, there is a need for a method with higher productivity.

As such a method, a rod-in-tube method of manufacturing a cladding layer, which occupies most of an optical fiber, by the use of a jacket of an optical-fiber silica glass tube, is known. This method is roughly classified into two types: a method of obtaining an optical fiber preform by inserting an optical-fiber core rod into an optical-fiber silica glass tube and then collapsing the tube onto the core rod in a heating furnace; and a method of obtaining an optical fiber at a time by drawing an optical-fiber core rod and an optical-fiber silica glass tube while collapsing the tube onto the core rod. Here, the optical-fiber core rod can be produced using a known production method such as a VAD method, an MCVD method, and an OVD method and generally includes a core portion transmitting light and a part of a cladding layer.

When the collapsing is carried out in a heating furnace, a seal member is necessary which serves to prevent outer gas from flowing into a muffle tube through a gap between the muffle tube and an optical fiber perform. This is because a heater or a muffle tube in the heating furnace is generally made of carbon. When the sealing ability (air tightness) between the muffle tube and the optical fiber preform is poor, oxygen intrudes into the muffle tube from the outside, thereby causing the degradation or burnout of carbon components. The seal member is used to prevent oxygen from intruding into the muffle tube from the outside.

In the former method of obtaining the optical fiber preform by the collapsing in the heating furnace, a gas seal for preventing gas from intruding into the muffle tube by allowing purge gas of 30 to 100 SLM to flow is employed.

However, in the latter method of obtaining the optical fiber at the time of the drawing together with the collapsing, the gas flow in the muffle tube is important and a gas seal using a large amount of purge gas causes a variation in fiber diameter. Accordingly, it is necessary to seal a gap between the muffle tube and the optical fiber without using the gas seal.

However, in the rod-in-tube using a large-sized optical-fiber silica glass tube with a diameter of ϕ100 mm or more, a dummy silica tube is generally jointed to an end of the optical-fiber silica glass tube. By jointing the dummy silica tube, it is possible to draw an optical fiber up to the end of the optical-fiber silica tube. In addition, the dummy silica tube can be used as a grip for supporting the optical-fiber silica glass tube with a weight. In view of the cost, the dummy silica tube is smaller in outer diameter and thickness than the optical-fiber silica glass tube within a range where the strength can be maintained. The dummy silica tube may be reused and thus the outer diameter may decrease with an increase in the number of times used. That is, when the dummy silica tube is repeatedly reused, a difference in outer diameter is necessarily caused between the optical-fiber silica glass tube and the dummy silica tube. When an optical fiber is drawn up to the end of the optical-fiber silica glass tube, the jointed portion between the optical-fiber silica glass tube and the dummy silica tube is put into the muffle tube in the last stage of the drawing process.

However, as described above, since the difference in outer diameter exists between the optical-fiber silica glass tube and the dummy silica tube, the sealing ability at the muffle tube is varied during the drawing. Accordingly, the gas flow in the muffle tube varies, thereby causing a variation in fiber diameter. As a result, a problem of a decrease in the yield of the optical fiber or a degradation of carbon components due to the intrusion of oxygen occurs.

To solve the above-mentioned problem, various devices for improving the sealing ability between the muffle tube and the optical fiber preform have been proposed.

In an optical fiber drawing furnace disclosed in Japanese Unexamined Patent Application, First Publication No. 2003-183045 (hereinafter, referred to as Patent Document 1), the inside of the muffle tube is maintained at a slight positive pressure using a carbon sheet having a hole corresponding to the diameter of the optical fiber preform and a gas seal together, thereby preventing ambient air from intruding and preventing dust from flying from the inside of the muffle tube.

In an optical fiber drawing apparatus disclosed in Japanese Unexamined Patent Application, First Publication No. 2005-8475 (hereinafter, referred to as Patent Document 2) in which a carbon film is used as a gas seal member, even when the difference in outer diameter exists between a preform and a handle, gas is prevented from intruding into the muffle tube from the outside by using separate gas seal mechanisms for the perform portion forming an optical fiber preform and the handle portion jointed to the upper end of the perform portion.

In an optical fiber drawing apparatus disclosed in Japanese Unexamined Patent Application, First Publication No. 2006-342030 (hereinafter, referred to as Patent Document 3), even when a difference in outer diameter exists in the optical fiber preform, the air tightness in the muffle tube can be maintained by using an extendable seal ring as a gas seal member for sealing an opening into which the optical fiber preform is inserted.

In an optical fiber drawing apparatus disclosed in Japanese Unexamined Patent Application, First Publication No. 2007-70189 (hereinafter, referred to as Patent Document 4), gas is prevented from intruding into the muffle tube from the outside by using a carbon brush of a doughnut disk shape, in which heat-resistant hairs are densely implanted, as a gas seal member for sealing an opening into which the optical fiber preform is inserted.

However, the optical fiber drawing furnaces and apparatuses disclosed in Patent Documents 1 to 4 have the following problems.

Specifically, in the optical fiber drawing furnace disclosed in Patent Document 1, the carbon sheet having a hole corresponding to the diameter of the optical fiber preform is used together with the gas seal, in which the inner diameter of the hole formed in the carbon sheet is constant. Accordingly, with a variation in the diameter of the optical fiber preform, a gap is caused between the optical fiber preform and the hole of the carbon sheet. As a result, since the pressure in the muffle tube varies, it is necessary to adjust the gas flow rate so as to correct the variation in pressure. However, the variation of the gas flow rate during the drawing causes a variation in the fiber diameter, which is not desirable.

In the optical fiber drawing apparatus disclosed in Patent Document 2, the gas seal mechanisms are used in the preform and the handle, respectively, to cope with the difference in outer diameter and a flat disk or a cylinder for loading a carbon film, a seal ring, and a weighting ring serving as a weight of the carbon film are necessary for the gas seal of the handle. However, since the members made of metal or silica glass are heavy, the workability for adjusting the levelness of the carbon film is poor. When a material equal to or harder than glass is used, the optical fiber preform may be damaged by mistake.

In the optical fiber drawing apparatus disclosed in Patent Document 3, the extendable seal ring is used as the gas seal member. However, the seal ring includes plural seal ring pieces bonded to each other. Accordingly, since the extension and contraction of the seal ring pieces due to heat are inevitable, the seal ring pieces may not be accurately bonded to each other. Since the bonding accuracy between the seal ring pieces is poor, a gap is caused between the bonded seal ling pieces, thereby degrading the sealing performance. An extension spring for extending and contracting the seal ring pieces may fail to work because of degradation due to heat. In addition, dust generated by the oxidation due to heat may intrude into the extension spring, thereby causing the spring to not work smoothly.

In the optical fiber drawing apparatus disclosed in Patent Document 4, the carbon brush of a doughnut disk shape is used as the gas seal member and the heat-resistant hairs are densely implanted in the carbon brush. Accordingly, a large amount of powders generated in use may be adhered to the optical fiber preform, thereby causing fiber breaking.

As described in the patent documents, when the carbon sheet is used as the seal member, it is necessary to form an opening greater than the maximum diameter of the optical fiber preform so as not to bring the inner circumferential edge of the opening into direct contact with the optical fiber preform. However, in this case, when the outer diameter of the optical fiber preform decreases with the drawing of the fiber, there is a problem in that the gap between the opening of the carbon sheet and the optical fiber preform increases, thereby not maintaining the sealing ability. On the other hand, to secure the sealing ability, the use of a carbon sheet having an opening smaller than the minimum diameter of the optical fiber preform can also be considered. However, in this case, the outer circumferential surface of the optical fiber preform and the opening of the carbon sheet come in contact with each other and slide relative to each other, thereby damaging the carbon sheet.

In the rod-in-tube method using a large-sized optical-fiber silica glass tube with a diameter of $\phi$100 mm or more, the dummy silica tube is generally jointed to the end of the optical-fiber silica glass tube. As described above, it is preferable in view of cost that the dummy silica tube be smaller in diameter than the optical-fiber silica glass tube. However, since the difference in outer diameter exists between the optical-fiber silica glass tube and the dummy silica tube, the sealing ability of the seal member may be degraded by the entrance of the dummy silica tube into the muffle tube.

As a result, ambient air intrudes into the furnace to cause the variation in fiber diameter at the time of the drawing and to degrade the carbon components (such as a heater).

SUMMARY OF THE INVENTION

As a countermeasure, it can be considered that a seal member obtained by combining plural carbon sheets is used between the muffle tube, and the optical fiber preform or the dummy silica tube. However, as described above, since the carbon sheet is very brittle, it is easily folded by an external force. When the thickness of the carbon sheet is thin, the carbon sheet can be flexible, but hard to completely prevent it from being destroyed.

The present invention is contrived in view of the above-mentioned circumstances, and has an object of providing an optical fiber manufacturing apparatus and an optical fiber manufacturing method, (1) which cannot cause a gap between the optical fiber preform and the muffle tube to maintain the satisfactory sealing ability even when a difference in outer diameter exists between the optical fiber silica glass tube and a dummy silica tube and (2) which can maintain the excellent sealing ability at which the optical fiber perform is inserted and thus suppress the oxygen concentration in the drawing furnace to be lower than a target value (the oxygen concentration at an end of an inner space of the drawing furnace close to a seal member is 200 ppm or less) to stabilize the fiber diameter even when the outer diameter of the optical fiber preform varies with the drawing. That is, an object of the present invention is to provide an optical fiber manufacturing apparatus and an optical fiber manufacturing method, which need not use the conventional weight for maintaining the sealing ability and cannot cause problems relating to the damage of the optical fiber preform (Patent Document 2), problems relating to the poor bonding between the seal ring pieces and the generation of dust (Patent Document 3), or problems relating to the poor workability due to the generation of a large amount of powders (Patent Document 4).

In order to achieve the above-mentioned object, the present invention employs the following.

In particular, a first aspect of the present invention is an optical fiber manufacturing apparatus for manufacturing an optical fiber by drawing a optical fiber preform, including: a drawing furnace having therein a muffle tube into which the optical fiber preform is inserted and heating the optical fiber preform; and a first seal member which is disposed at an insert side of the drawing furnace so as to be coaxial with the drawing furnace and which seals the optical fiber preform inserted into an opening formed at the center thereof, wherein the first seal member includes a plurality of inner-circumference slits formed in the inner circumference thereof and a plurality of outer-circumference slits formed in the outer circumference thereof.

It may be arranged such that: the inner-circumference slits and the outer-circumference slits of the first seal member are formed along radial directions of the opening into which the optical fiber preform is inserted; and the inner-circumference slits and the outer-circumference slits are alternately arranged in a circumferential direction of the first seal member.

It is preferable that the first seal member consist of a carbon sheet.

It may be arranged such that the optical fiber manufacturing apparatus further includes a second seal member having an opening at the center thereof, being disposed to be coaxial with the first seal member, and having no slit.

Further, it may be arranged such that: the optical fiber manufacturing apparatus is provided with a plurality of the second seal members; and the first seal member is disposed between the second seal members separated from each other in the axis direction of the muffle tube.

It is preferable that the inner diameter of the opining of the second seal member be larger than the maximum diameter of the optical fiber preform.

It is preferable that the inner diameter of the opening of the first seal member be smaller than the minimum diameter of the optical fiber preform.

It may be arranged such that the optical fiber manufacturing apparatus further includes a dummy silica tube joined to an end of the optical fiber preform.

Meanwhile, a second aspect of the present invention is an optical fiber manufacturing method including the steps of: inserting an optical fiber preform into a muffle tube disposed in a drawing furnace; and drawing the optical fiber preform in a state where the optical fiber preform inserted into an opening formed at the center of a first seal member is sealed by the first seal member disposed at an insert side of the drawing furnace so as to be coaxial with the drawing furnace, wherein the first seal member includes a plurality of inner-circumference slits formed in the inner circumference thereof and a plurality of outer-circumference slits formed in the outer circumference thereof.

It may be arranged such that: the inner-circumference slits and the outer-circumference slits of the first seal member are formed along radial directions of the opening into which the optical fiber preform is inserted; and the inner-circumference slits and the outer-circumference slits are alternately arranged in a circumferential direction of the first seal member.

It is preferable that the first seal member consist of a carbon sheet.

It may be arranged such that: a second seal member having an opening at the center thereof and having no slit is disposed at an insert side of the drawing furnace so as to be coaxial with the first seal member; and the optical fiber preform is drawn in a state where the optical fiber preform is inserted into the openings of the first and second seal members.

It may be arranged such that: a plurality of the second seal members are disposed at an insert side of the drawing furnace; the first seal member is disposed between the second seal members separated from each other in the axis direction of the muffle tube; and the optical fiber preform is drawn in a state where the optical fiber preform is inserted into the openings of the first and second seal members.

It is preferable that the inner diameter of the opening of the second seal member be larger than the maximum diameter of the optical fiber preform.

It may be arranged such that: the inner diameter of the opening of the first seal member is smaller than the minimum diameter of the optical fiber perform; and the optical fiber preform is drawn in a state where the inner circumferential edge of the first seal member is elastically urged to and made to contact the outer circumference of the optical fiber preform with the elastic deformation of the first seal member.

It may be arranged such that: an inner space of the drawing furnace is maintained at a positive pressure by simultaneously performing a depressurization resulting from the evacuation of the inner space of the drawing furnace and a gas purge resulting from the introduction of inert gas; and the optical fiber preform is drawn in a state where an oxygen concentration beneath the seal member is 200 ppm or less.

It may be arranged such that a dummy silica tube is joined to an end of the optical fiber preform.

According to the optical fiber manufacturing apparatus and the optical fiber manufacturing method described above, since the first seal member which is disposed at the end of the drawing furnace and has the plural inner-circumference slits and the plural outer-circumference slits to enhance the degree of freedom in deformation is used, it is possible to suppress the damage to the seal member and to maintain the sealing ability of the seal member for sealing the periphery of the optical fiber preform.

It is possible to bring the ends of the seal pieces between the inner-circumference slits (i.e., the inner circumferential edge of the slit-formed seal member) into close contact with the optical fiber preform by the deformation of the slit-formed seal member. In addition, even when the outer diameter of the optical fiber preform varies during the drawing of the optical fiber or when a difference in outer diameter exists between the optical-fiber silica glass tube and the dummy silica tube, it is possible to maintain the excellent sealing ability between the optical fiber preform and the muffle tube without causing a gap between the optical fiber preform and the muffle tube. Accordingly, it is possible to prevent ambient air from intruding and to easily suppress the oxygen concentration in the drawing furnace to be equal to or less than a target value (for example, the oxygen concentration in the end of the inner space of the drawing furnace close to the seal member is 200 ppm or less). As a result, it is possible to stabilize the diameter of the drawn fiber and to accomplish the prevention of degradation and the extension of the lifetime of the muffle tube or the heater formed of carbon in the drawing furnace.

In addition, it is possible to manufacture an optical fiber with a constant diameter without using the conventional weight for maintaining the sealing ability without causing problems relating to the damage of the optical fiber preform (Patent Document 2), problems relating to the poor bonding between the seal ring pieces and the generation of dust (Patent Document 3), or problems relating to the poor workability due to the generation of a large amount of powders (Patent Document 4).

BRIEF DESCRIPTION OF THE DRAWINGS

FIG. 2A shows an initial state, FIG. 2B shows a state where an optical fiber preform is inserted into a drawing furnace, and FIG. 2C shows a state where a dummy silica tube is inserted into a drawing furnace.

FIG. 3A shows a slit-less carbon sheet, FIG. 3B shows a slit-formed carbon sheet, and FIG. 3C shows a carbon sheet having slits formed in only the inner circumference.

DETAILED DESCRIPTION OF THE INVENTION

Figure 1:
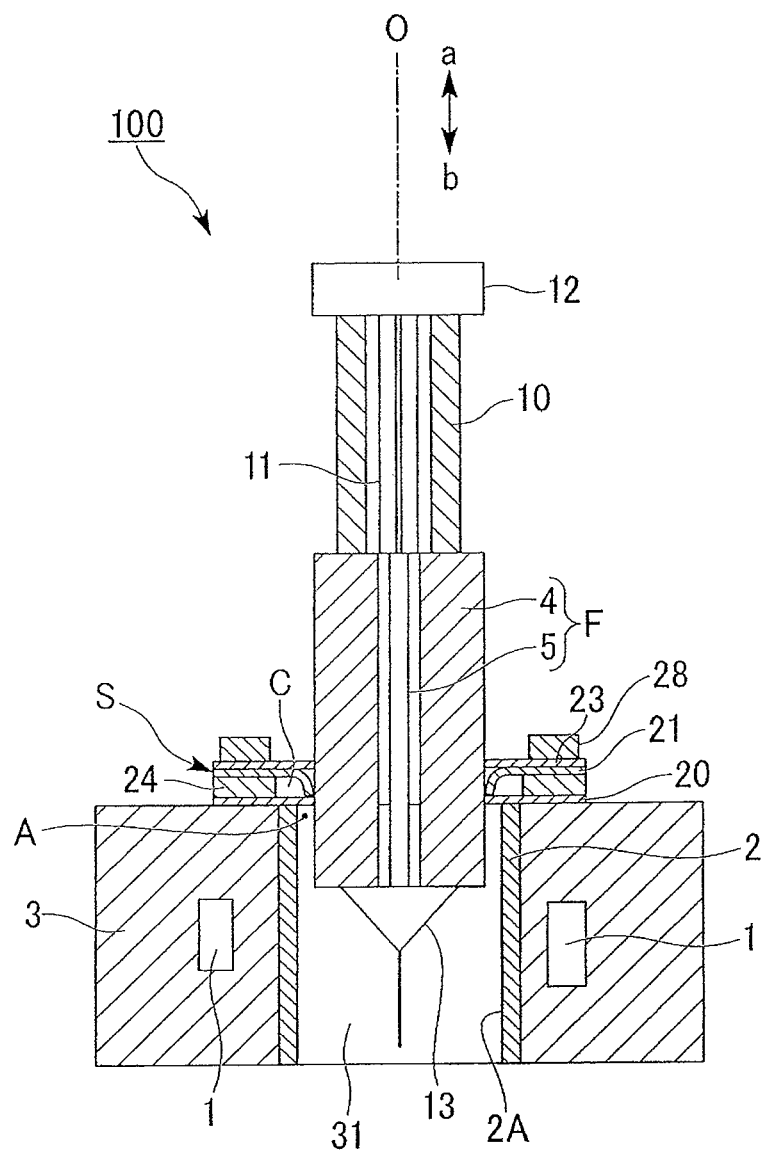
FIG. 1 is a schematic block diagram showing an optical fiber manufacturing apparatus according to an embodiment of the present invention.

Hereinafter, an optical fiber manufacturing apparatus and an optical fiber manufacturing method according to an embodiment of the present invention will be described with reference to the drawings.

Taking particular noted of the fact that a fiber diameter is stabilized with an oxygen concentration filled in a drawing furnace equal to or less than a predetermined value, the present invention is directed to accomplishing a constant fiber diameter by maintaining the oxygen concentration within a constant range. In order to accomplish the object, the present invention provides an optical fiber manufacturing apparatus and an optical fiber manufacturing method which can properly maintain the sealing ability at a position where an optical fiber preform is inserted into the drawing furnace.

In general, the specification of optical fibers used in public communications is determined by an international standard such as ITU-T. The outer diameter of the representative optical fiber is φ125 μm. Accordingly, it is preferable that the outer diameter of an optical fiber be φ125.0 μm.

However, it is known that a slight variation in outer shape is caused during the drawing of the optical fiber and that the optical fiber has a slight noncircular part. Accordingly, it is difficult to keep the outer diameter of the optical fiber to φ125.0 μm over the entire length thereof. It is also known that measuring errors due to averaging or temperature exist in commercial outer diameter measuring system (for example, a laser outer diameter measuring system, with product number KL-151 A•TW made by Anritsu Corporation).

In the ITU-T standard (G.652), the outer diameter of a general single mode fiber is defined as 125.0±1 μm. In the newest ITU standard (G.657), the outer diameter of a low bending-loss fiber is defined as 125.0±0.7 μm.

In view of this situation, it is preferable that the center value be φ1250 μm and the tolerance of the variation in outer diameter of an optical fiber be ±0.5 μm. Alternatively, it can be expressed that the outer diameter of an optical fiber is stabilized. It is more preferable that the center value be φ125.0 μm and the tolerance of the variation in outer diameter of an optical fiber be ±0.2 μm. Particularly, when the outer diameter of an optical fiber is φ125.0±0.2 μm over the entire length, the stability in diameter of the optical fiber is improved. In general, when the outer diameter of an optical fiber is unstable, it is known that the strength of the optical fiber decreases or the connection loss of the optical fiber deteriorates. Accordingly, from the viewpoint of improving the reliability of an optical fiber, it is important to improve the stability of the diameter of the optical fiber.

In order to manufacture an optical fiber having an outer diameter of φ125.0±0.2 μm over the entire length, the inventors have studied variations in the fiber diameter of an optical fiber preform, the sealing ability between a muffle tube and the optical fiber preform, and the oxygen concentration in the furnace. As a result, it was found that the fiber diameter could be suppressed to φ125.0±0.2 μm, by keeping the oxygen concentration (the oxygen concentration measured at point A in FIGS. 1 and 5) just beneath a carbon sheet (to be described later) as a seal member to 200 ppm or less. It was found that the degradation of carbon components in the optical fiber manufacturing apparatus was suppressed when the oxygen concentration was in the above-mentioned range. Further, it was found that the lifetime of the carbon components was elongated when the oxygen concentration was equal to or less than 100 ppm.

A specific configuration for manufacturing an optical fiber having an outer diameter of φ125.0±0.2 μm over the entire length of the optical fiber will be described below.

FIG. 1 shows an optical fiber manufacturing apparatus 100 according to an embodiment of the present invention. The optical fiber manufacturing apparatus 100 includes: a drawing furnace 3 having a built-in heater 1 and a muffle tube 2 into which an optical fiber preform F is inserted; and an annular seal mechanism S of which an opening (to be described later) is disposed above the muffle tube 2 to have the same center axis (indicated by reference sign O) as the muffle tube. The muffle tube 2 is disposed in the axial direction (the direction of arrow a-b) in the drawing furnace 3.

Figure 5:
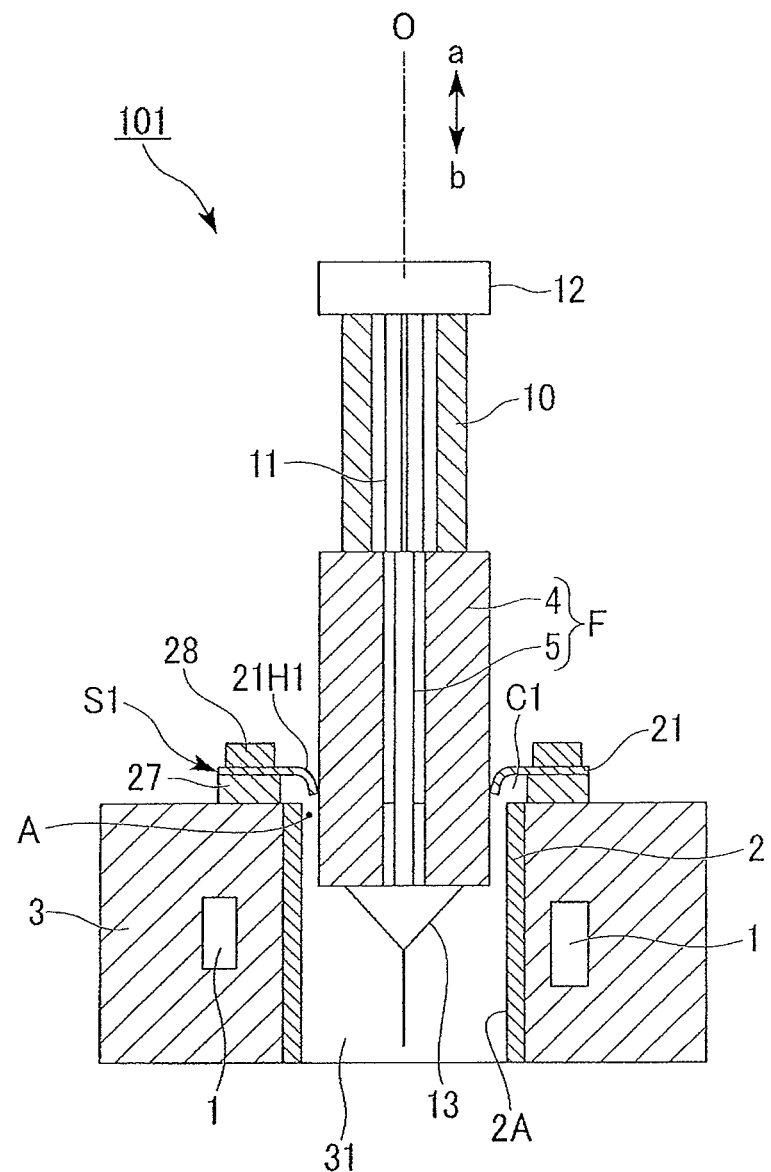
FIG. 5 is a schematic block diagram showing another configuration (employing a seal mechanism having only a slit-formed carbon sheet as a seal member) of the optical fiber manufacturing apparatus according to the embodiment of the present invention.

An optical fiber manufacturing apparatus 101 shown in FIG. 5 is another example of the optical fiber manufacturing apparatus according to the present embodiment. The optical fiber manufacturing apparatus 101 shown in FIG. 5 is different from the optical fiber manufacturing apparatus 100 shown in FIG. 1 in the seal mechanism S1 and is similar to the optical fiber manufacturing apparatus 100 shown in FIG. 1, in the configuration other than the seal mechanism S1.

In the following description, the upside in FIG. 1, FIGS. 2A to 2C, and FIG. 5 is referred to as top and the downside is referred to as the bottom.

In FIGS. 1 and 5, the optical fiber preform F includes an optical-fiber silica glass tube 4 and an optical-fiber core rod 5 inserted into the silica glass tube. A dummy silica tube 10, a silica tube 11, and a vacuuming cap 12 are disposed at the upper end of the optical fiber preform F and a dummy member 13 is disposed at the lower end.

The dummy silica tube 10 is a tube jointed by an $H_2/O_2$ burner to the upper end of the optical-fiber silica glass tube 4 and the silica tube 11 for supporting the optical-fiber core rod 5 with its end is inserted into the tube.

The vacuuming cap 12 is disposed on the upper end face of the dummy silica tube 10. After the optical-fiber core rod 5 is inserted into the dummy silica tube 10, the vacuuming cap 12 fixes and keeps the optical-fiber core rod 5 to the inside of the dummy silica tube 10.

The dummy member 13 is fixed to the lower end of the optical-fiber silica glass tube 4 by an $H_2/O_2$ burner and serves as an outlet portion at the time of drawing a fiber.

The seal mechanism S of the optical fiber manufacturing apparatus 100 shown in FIG. 1 will be described below with reference to FIGS. 2A and 2C and FIGS. 3A and 3B.

Figure 2A:
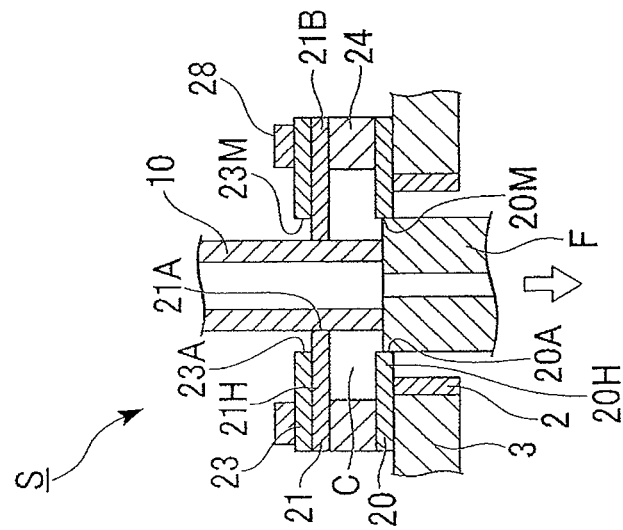
FIGS. 2A to 2C are views showing the operation of a slit-formed carbon sheet serving as a seal member of a seal mechanism, where
Figure 2B:
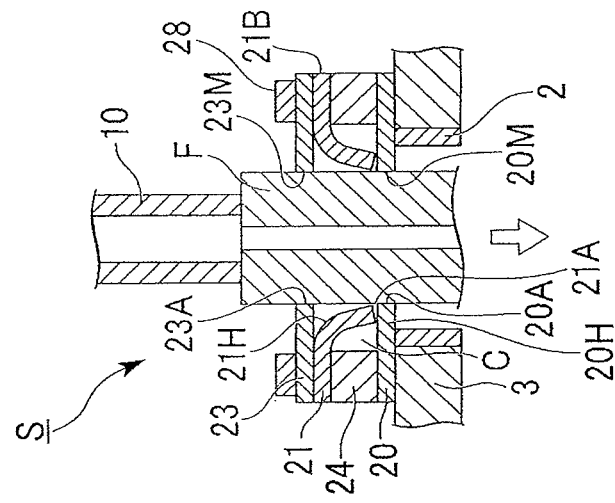
Figure 2C:
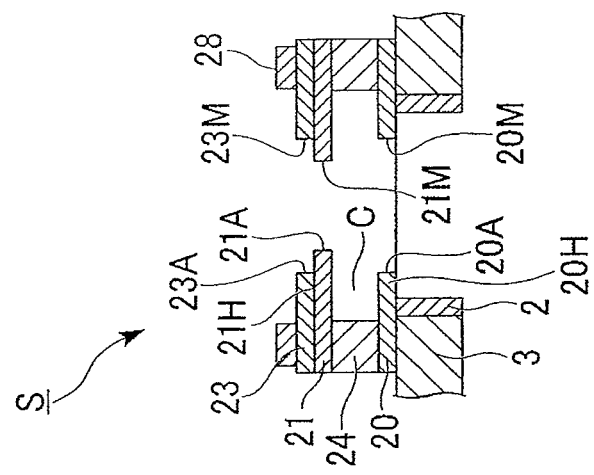

As shown in FIGS. 2A to 2C, the seal mechanism S is disposed on the drawing furnace 3. The seal mechanism S maintains the sealing ability using a seal member in which plural annular carbon sheets 20 and 21 are combined to prevent ambient air containing oxygen from intruding into the muffle tube 2.

Figure 3A:
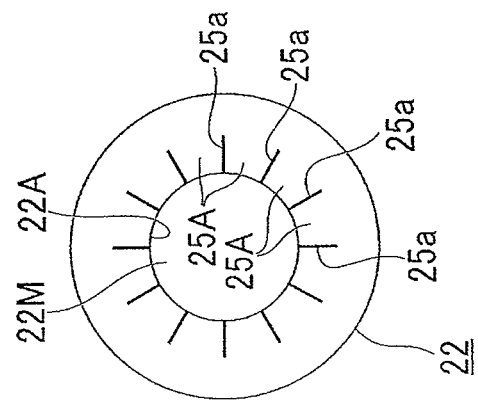
FIGS. 3A to 3C are plan views showing a carbon sheet, where
Figure 3B:
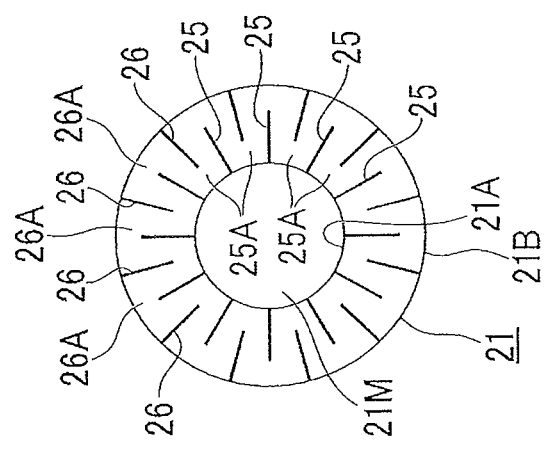

The seal mechanism S shown in FIG. 1 and FIGS. 2A to 2C includes a carbon sheet 21 (first seal member, hereinafter also referred to as slit-formed carbon sheet) having slits 25 and 26 formed therein as shown in FIG. 3B and two carbon sheets 20 and 23 (see FIG. 3A: second seal member, hereinafter also referred to as slit-less carbon sheet) which are annular members (carbon sheets) having no slit formed therein. The slit-formed carbon sheet 21 is disposed between two slit-less carbon sheets 20 and 23 separated from each other in the direction of the center axis O (in the vertical direction in FIG. 1) of the muffle tube 2 of the drawing furnace 3.

A sheet support 24 formed in a ring shape coaxial with the center axis O is disposed as a spacer under the slit-formed carbon sheet 21. The sheet support 24 is interposed between the slit-formed carbon sheet 21 and the slit-less carbon sheet 20 under the slit-formed carbon sheet and contacts the outer circumference of the slit-formed carbon sheet 21 and the outer circumference of the slit-less carbon sheet 20. In the slit-formed carbon sheet 21, a portion (protruding portion 21H) closer to the inner circumference than the portion of the slit-formed carbon sheet 21 contacting the sheet support 24 protrudes from the sheet support 24. The slit-less carbon sheet 20 under the slit-formed carbon sheet 21 also has a protruding portion 20H, which is a portion closer to the inner circumference than the portion contacting the sheet support 24, protruding from the sheet support 24.

The slit-less carbon sheet 23 above the slit-formed carbon sheet 21 overlaps the slit-formed carbon sheet 21.

Figure 4:
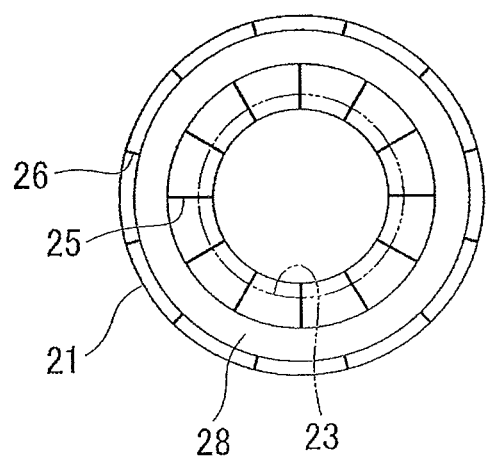
FIG. 4 is a plan view showing a relation between a weighting member and a slit-formed carbon sheet in a seal mechanism of the optical fiber manufacturing apparatus shown in FIG. 1 (where the slit-less carbon sheet 23 on the slit-formed carbon sheet is seen through).

An annular weighting member 28 for pressing three seal members (carbon sheets 20, 21, and 23) and the sheet support 24 against the drawing furnace 3 is disposed on the slit-less carbon sheet 23. As shown in FIGS. 2A to 2C and FIG. 4, the weighting member 28 is disposed on the outer circumferential portion of the slit-less carbon sheet 23 so as to overlap the sheet support 24 in the vertical direction (in a plan view). FIG. 4 is a plan view illustrating the slit-formed carbon sheet 21 which is seen through the slit-less carbon sheet 23 thereon.

The three seal members (carbon sheets 20, 21, and 23) and the sheet support 24 are not fixed to the drawing furnace 3 and the weighting member 28 is not fixed to the drawing furnace 3, either. In the seal mechanism S, the three seal members (carbon sheets 20, 21, and 23) and the sheet support 24 are pressed against the drawing furnace 3 by the mass (weight) of the weighting member 28.

As shown in FIGS. 2A to 2C, the slit-less carbon sheet 20 is an annular lower seal member disposed to contact the upper end face of the drawing furnace 3. The inner circumferential edge 20A forming an opening 20M protrudes slightly to the inside from the inner circumferential edge 2A of the muffle tube 2.

The slit-formed carbon sheet 21 is an annular intermediate seal member disposed to have a clearance in the axis direction (the direction of arrow a-b in FIG. 1 and the direction parallel to the center axis O) from the carbon sheet 20 with the sheet support 24 interposed therebetween. The inner circumferential edge 21A forming an opening 21M protrudes slightly to the inside from the inner circumferential edge 20A of the carbon sheet 20.

As shown in FIG. 3B, the carbon sheet 21 includes plural inner-circumference slits 25 extending in the radial direction from the inner circumferential edge facing the opening 21M and plural outer-circumference slits 26 extending in the radial direction from the outer circumferential edge. The slits 25 are formed along the inner circumferential edge 21A of the opening 21M at a constant interval and the slits 26 are formed along the outer circumferential edge 21B of the opening 21M at a constant interval. That is, the slits 25 and 26 are arranged in the circumferential direction of the carbon sheet 21.

FIG. 3B shows the slit-formed carbon sheet 21 according to an example (to be described later) of the present invention.

Figure 3C:
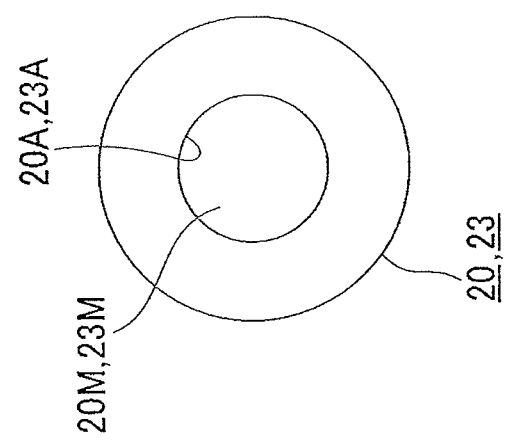

Meanwhile, FIG. 3C shows the carbon sheet 22 according to a comparative example (to be described later).

In the carbon sheet 22 shown in FIG. 3C, slits 25A extending from the inner circumferential edge of the opening 22M are formed along the inner circumferential edge 22A of the opening 22M at a constant interval. The carbon sheet 22 has a structure obtained by removing the outer-circumference slits 26 from the slit-formed carbon sheet 21 and has the same configuration as the slit-formed carbon sheet 21, except that the outer-circumference slits 26 are removed.

As shown in FIGS. 2A to 2C, the slit-less carbon sheet 23 is an annular upper seal member disposed to overlap the top face of the slit-formed carbon sheet 21. The inner circumferential edge 23A forming the opening 23M protrudes slightly to the inside from the inner circumferential edge 2A of the muffle tube 2, similarly to the carbon sheet 20.

The inner diameters of the openings 20M and 23M of the slit-less carbon sheets 20 and 23 are greater than the maximum diameter of the optical fiber preform F and greater than the outer diameter of the dummy silica tube 10. Accordingly, the slit-less carbon sheets 20 and 23 are not destroyed by contact with the optical fiber preform F.

In FIG. 1, the dummy silica tube 10 having an outer diameter slightly smaller than the outer diameter of the optical fiber preform F is shown. Since the inner diameters of the openings 20M and 23M of the slit-less carbon sheets 20 and 23 are slightly greater than the maximum diameter of the optical fiber preform F, the gap in a state where the dummy silica tube 10 is inserted into the openings 20M and 23M of the slit-less carbon sheets 20 and 23 is kept small.

The inner diameter of the opening 21M of the slit-formed carbon sheet 21 located in the middle is smaller (slightly smaller) than the minimum diameter of the optical fiber preform F and is slightly smaller than the outer diameter of the dummy silica tube 10. Accordingly, the slit-formed carbon sheet 21 comes in close contact with the optical fiber preform F and the dummy silica tube 10, thereby providing the high sealing performance.

As described above, the plural inter-circumference slits 25 and the plural outer-circumference slits 26 are formed in the intermediate slit-formed carbon sheet 21 according to an example of the present invention. As shown in FIG. 3B, the slits 25 and 26 are formed in a radial fashion in the radial direction of the opening 21M and are alternately arranged in the circumferential direction of the slit-formed carbon sheet 21 (in the direction along the inner circumferential edge 21A and the outer circumferential edge 21B).

As described above, since the inner-circumference slits 25 and the outer-circumference slits 26 are formed in the slit-formed carbon sheet 21 of the seal mechanism S, the degree of freedom in shape deformation is higher than that of the case where the slits 25 and 26 are not formed, whereby it is difficult for the slit-formed carbon sheet to be destroyed. The slit-formed carbon sheet 21 can better respond to three-dimensional deformation than in the case where the slits 25 and 26 are not formed. Accordingly, as shown in FIG. 2B, when the optical fiber preform F having an outer diameter greater than the inner diameter of the opening 21M is inserted into the seal mechanism S, the vertical stress due to the movement of the optical fiber preform F to the seal mechanism S or the horizontal stress due to the bending of the optical fiber preform F can be effectively distributed by the overall deformation of the slit-formed carbon sheet 21. Accordingly, it is possible to suppress the destruction of the slit-formed carbon sheet 21.

In the slit-formed carbon sheet 21, the downward deformation force due to the movement of the optical fiber preform F to the seal mechanism S acts on the inner circumferential edge 21A. Accordingly, as shown in FIG. 2B, the downward bending deformation is caused in the seal pieces 25A between the inner-circumference slits 25 and the inner circumferential edge 21A is elastically urged to the optical fiber preform F by the elastic restoring force of the slit-formed carbon sheet 21. Accordingly, it is possible to secure the property that the inner circumferential edge 21A of the slit-formed carbon sheet 21 follows the variation in the outer diameter of the optical fiber preform F and maintain the state where the inner circumferential edge 21A contacts the optical fiber preform F, thereby stably securing the sealing ability.

In the seal mechanism S, a clearance C is secured between the protruding portion 21H of the slit-formed carbon sheet 21 and the protruding portion 20H of the slit-less carbon sheet 20 by the sheet support 24 disposed as a spacer between the slit-formed carbon sheet 21 and the slit-less carbon sheet 20 below the slit-formed carbon sheet. The clearance C effectively contributes to securing the degree of freedom of the deformation of the slit-formed carbon sheet 21, particularly, the bending deformation (see FIG. 2B) of the slit-formed carbon sheet 21 due to the downward deformation force acting on the inner circumferential edge 21A due to the movement of the optical fiber preform F to the seal mechanism S.

The distance between the slit-formed carbon sheet 21 and the slit-less carbon sheet 20 is sufficiently secured so that the inner circumferential edge 21A of the slit-formed carbon sheet 21 deformed by the movement of the optical fiber preform F to the seal mechanism S does not contact the slit-less carbon sheet 20. Accordingly, it is possible to avoid the influence of the deformation of the slit-formed carbon sheet 21 on the sealing ability of the slit-less carbon sheet 20.

As described above, the seal mechanism S presses the three seal members (carbon sheets 20, 21, and 23) and the sheet support 24, which are not fixed to the drawing furnace 3, to the drawing furnace 3 by the mass (weight) of the weighting member 28 not fixed to the drawing furnace 3. In addition, the mass of the weighting member 28 is set to move slightly with the deformation of the slit-formed carbon sheet 21 due to the movement of the optical fiber preform F and the weighting member 28 permits the deformation of the slit-formed carbon sheet 21. The weighting member 28 suppresses the three seal members (carbon sheets 20, 21, and 23) and the sheet support 24 from being separated from the drawing furnace 3, and presses the three seal members (carbon sheets 20, 21, and 23) and the sheet support 24 to the drawing furnace 3 while permitting the deformation of the slit-formed carbon sheet 21.

The three seal members (carbon sheets 20, 21, and 23) and the sheet support 24 can be deformed in the direction perpendicular to the center axis O.

Since the three seal members and the sheet support 24 can be deformed in the direction perpendicular to the center axis O of the seal members, it is possible to prevent an excessive force from acting on the seal members by allowing the seal members to be deformed in the direction perpendicular to the center axis O, for example, when the axis of the optical fiber preform F departs from the center axis O or when the optical fiber preform F is inclined about the center axis O. As a result, it is possible to prevent the destruction of the seal members (carbon sheets).

The sheet support 24 of the seal mechanism S is not essential but may be omitted. For example, when the difference in outer diameter between the dummy silica tube 10 and the optical-fiber silica glass tube 4 is small, the amount of deformation of the slit-formed carbon sheet 21 due to the movement of the optical fiber preform F is small. Accordingly, even when the clearance C is not formed using the sheet support 24, the difference in outer diameter can be absorbed by the deformation of the slit-formed carbon sheet 21.

The seal mechanism S1 of the optical fiber manufacturing apparatus 101 shown in FIG. 5 includes only the slit-formed carbon sheet 21 as a seal member but does not include the slit-less carbon sheet.

Similarly to the optical fiber manufacturing apparatus 100 shown in FIG. 1, the slit-formed carbon sheet 21 is disposed to protrude slightly to the inside from the inner circumferential edge 2A of the muffle tube 2 (where the opening is represented by reference numerals 21M). As described above, the inner diameter of the opening 21M of the slit-formed carbon sheet 21 is smaller (slightly smaller) than the minimum diameter of the optical fiber preform F and is slightly smaller than the outer diameter of the dummy silica tube 10.

In the slit-formed carbon sheet 21 of the seal mechanism S1 of the optical fiber manufacturing apparatus 101, the vertical stress due to the movement of the optical fiber preform F to the seal mechanism S1 or the horizontal stress due to the bending of the optical fiber preform F can be effectively distributed by the overall deformation of the slit-formed carbon sheet 21. Accordingly, it is possible to suppress the destruction of the slit-formed carbon sheet 21. The inner circumferential edge 21A is elastically urged to the optical fiber preform F by the elastic restoring force of the slit-formed carbon sheet 21 bent with the downward deformation force due to the movement of the optical fiber preform F to the seal mechanism S1. Accordingly, it is possible to secure the property that the inner circumferential edge 21A of the slit-formed carbon sheet 21 follows the variation in the outer diameter of the optical fiber preform F and maintain the state where the inner circumferential edge 21A contacts the optical fiber preform F, thereby stably securing the sealing ability.

The slit-formed carbon sheet 21 of the seal mechanism S1 has a ring shape coaxial with the center axis O and is not fixed to, but is disposed on the sheet support 27 fixed to the drawing furnace 3. The slit-formed carbon sheet 21 is pressed to the sheet support 27 by the above-mentioned weighting member 28 placed on the slit-formed carbon sheet 21.

In the seal mechanism S1, the slit-formed carbon sheet 21 has a protruding portion 21H1 protruding to the inside from the sheet support 27. Since a clearance C1 is secured between the protruding portion 21H1 and the drawing furnace 3, it is possible to secure the degree of freedom in deformation of the slit-formed carbon sheet 21.

The sheet support 27 of the seal mechanism S1 is not essential and may be omitted. For example, when the difference in outer diameter between the dummy silica tube 10 and the optical-fiber silica glass tube 4 is small, the amount of deformation of the slit-formed carbon sheet 21 due to the movement of the optical fiber preform F is small. Accordingly, even when the clearance C1 is not formed using the sheet support 27, the difference in outer diameter can be absorbed by the deformation of the slit-formed carbon sheet 21.

In that the sealing ability at the end (upper end) of the drawing furnace 3 is secured, the optical fiber manufacturing apparatus 100 employing the seal mechanism S including the slit-formed carbon sheet 21 and the slit-less carbon sheets is superior to the optical fiber manufacturing apparatus 101 employing the seal mechanism S1 including only one seal member.

In the seal mechanism S of the optical fiber manufacturing apparatus 100 shown in FIG. 1 and FIGS. 2A to 2C, the carbon sheets 20 and 23 are disposed vertically with the slit-formed carbon sheet 21 interposed therebetween. However, the seal mechanism of the optical fiber manufacturing apparatus according to the present invention is not limited to this configuration, but many slit-less carbon sheets (slit-less seal members) may be disposed. In this case, it is possible to further enhance the sealing ability.

In manufacturing an optical fiber using the optical fiber manufacturing apparatuses 100 and 101, the gap in the optical-fiber silica glass tube 4 is depressurized by a vacuum pump (not shown) during the drawing, whereby the oxygen concentration in the furnace (the oxygen concentration in a furnace space 31 (the space in the muffle tube 2 in the drawing)) is made to decrease. In addition, it is preferable that the gas purge be performed by introducing inert gas into the lower side of the seal mechanism S. That is, the furnace space 31 is maintained in a positive pressure by concurrently performing the depressurization by the vacuuming and the gas purge by the introduction of the inert gas. Since the sealing ability of the carbon sheets 20, 21, and 23 for the gap between the drawing furnace 3 and the optical-fiber silica glass tube 4 is high, the oxygen concentration in the furnace can be kept low in the gas purge using a small flow rate. By combining the plural carbon sheets 20, 21, and 23, it is possible to maintain the sealing ability over the entire length of the optical fiber preform F without destroying the seal mechanism S even when the outer diameter of the optical-fiber silica glass tube 4 varies. Accordingly, it is possible to easily draw the optical fiber preform in a state where the oxygen concentration at the end (just below the carbon sheet 20) close to the seal member in the furnace space 31 is kept to 200 ppm or less.

Since the seal mechanism S employs a carbon sheet having slits extending from the opening of the annular carbon sheet, the folding of the carbon sheet can be suppressed (specifically, the folding of the inner circumferential edge contacting with the optical fiber preform F can be suppressed). However, as shown in FIG. 3C, in the carbon sheet 22 having only the slits 25A extending from the opening 22M but not having the outer-circumference slits 26 (see FIG. 3C), the permitted difference in the outer diameter of the optical fiber preform F is about 3 mm which is small.

Accordingly, to enlarge the permitted difference in the outer diameter as described above, the inventors found that the slit-formed seal member having the slits (the inner-circumference slits 25) extending from the inner circumference and the slits (the outer-circumference slits 26) extending from the outer circumference could be used similarly to the slit-formed carbon sheet 21 shown in FIG. 3B. The slit-formed carbon sheet 21 has an increased degree of freedom in shape deformation due to the slits 25 and 26. Accordingly, even when the slit-formed carbon sheet 21 is bent three-dimensionally by the vertical stress due to the movement of the optical fiber preform F or the horizontal stress due to the bending of the optical fiber preform F, it is difficult for the slit-formed carbon sheet 21 to be destroyed, thereby suppressing the destruction thereof.

The slit-formed carbon sheet according to the present invention is not limited to the configuration in which the inner-circumference slits 25 and the outer-circumference slits 26 are alternately arranged in the circumferential direction thereof. A configuration in which the inner-circumference slits 25 and the outer-circumference slits 26 are formed in series in the radial direction of the annular carbon sheet may be employed.

To suppress the destruction of the slit-formed carbon sheet 21, it is preferable that the slits 25 and 26 formed at plural positions in the circumferential direction of the slit-formed carbon sheet 21 have intervals equal to or less than 20 degrees (corresponding to 18 or more slits on the inner circumference and the outer circumference) about the center of the slit-formed carbon sheet 21. When the inner-circumference slits 25 and the outer-circumference slits 26 are alternately formed, it is possible to further suppress the destruction.

The inventors found that the slit-formed carbon sheet 21 was not destroyed and had a high resistance to an external force even when the difference in outer diameter of the optical fiber preform F is the maximum of 10 mm, by alternately forming the slits in the inner circumferential edge 21A and the outer circumferential edge 21B at an interval of 5 degrees (by forming 72 slits in each of the inner circumference and the outer circumference) about the center of the slit-formed carbon sheet 21. The thickness of the slit-formed carbon sheet 21 depends on the number of slits 25 and 26, but is preferably in the range of 0.4 to 1.0 mm.

Figure 6:
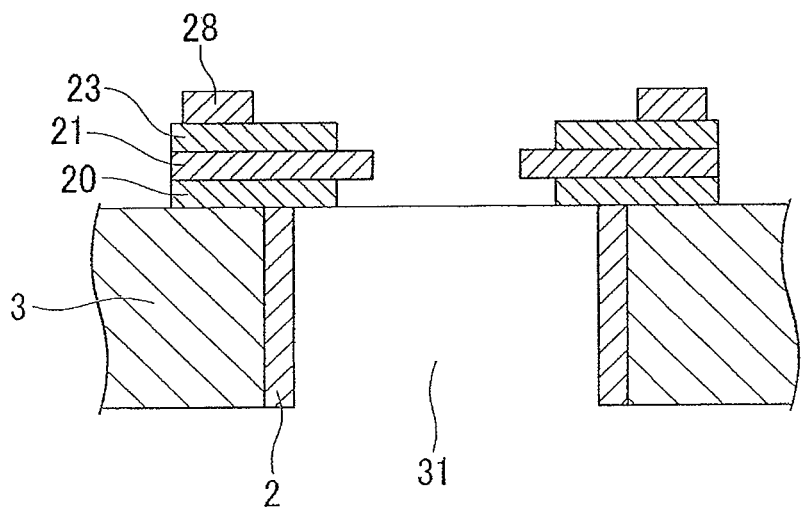
FIG. 6 is a schematic block diagram showing another configuration (slit-less carbon sheets are disposed on and under a slit-formed carbon) of the optical fiber manufacturing apparatus according to the embodiment of the present invention.

When the deformation of the slit-formed carbon sheet 21 due to the movement of the optical fiber preform F is small, for example, when the difference in outer diameter between the dummy silica tube 10 and the optical-fiber silica glass tube 4 is small, the seal mechanism shown in FIG. 6 may be employed.

In the seal mechanism S2 shown in FIG. 6, two slit-less carbon sheets 20 and 23 are disposed on and under the slit-formed carbon sheet 21 and overlap to come in direct contact with the slit-formed carbon sheet 21. In the seal mechanism S2 shown in FIG. 6, the carbon sheets 20, 21, and 23 are pressed to the drawing furnace 3 by an annular weighting member 28 placed (not fixed to the drawing furnace 3) on the slit-less carbon sheet 23 on the slit-formed carbon sheet 21, thereby suppressing the sheets from being separated from the drawing furnace 3.

In the seal mechanism S2, when the deformation of the slit-formed carbon sheet 21 due to the movement of the optical fiber preform F is small, it is possible to avoid the destruction of the slit-less carbon sheets 20 and 23 due to the deformation of the slit-formed carbon sheet 21 as well as to suppress the destruction of the slit-formed carbon sheet 21. Accordingly, since the carbon sheets 20, 21, and 23 can be used for a long time, it is possible to stably secure excellent long-term sealing ability.

The seal mechanism S having the carbon sheets 20, 21, and 23 was tested as follows.

In Examples 1 to 5 of the present invention described below, the slit-formed carbon sheet 21 having the slits 25 and 26 formed in both of the inner circumferential edge 21A and the outer circumferential edge 21B is used as an intermediate seal member of the seal mechanism S. On the other hand, in Comparative Examples 1 to 3, the intermediate seal member is not used (Comparative Example 1) or the carbon sheet 22 having the slits 25 in only the inner circumferential edge 22A of the opening 22M is used as the intermediate seal member (Comparative Examples 2 and 3).

Example 1

A dummy silica tube 10 with an outer diameter of $\phi 145$ mm, an inner diameter of $\phi 80$ mm, and a length of 800 mm was jointed by an $H_2/O_2$ burner to an end of an optical-fiber silica glass tube 4 with an outer diameter of $\phi 155$ mm, an inner diameter of $\phi 45$ mm, and a length of 1500 mm.

A dummy member 13 (with a length of 100 mm) serving as an outlet portion at the time of drawing a fiber was jointed by an $H_2/O_2$ burner to the other end of the optical-fiber silica glass tube 4.

The optical-fiber silica glass tube 4, the dummy silica tube 10, and the dummy member 13 which had been jointed together were cleaned with hydrofluoric acid, rinsed with pure water, and then dried. The inner face of the dried optical-fiber silica glass tube 4 was lit with a halogen lamp and observed. As a result, no defects and no dry spots (water marks) were observed.

Thereafter, a fluorine-resin protective jig (not shown in the figures) from which static electricity was removed in advance was inserted into the dummy silica tube 10 up to the vicinity of the jointed portion of the optical-fiber silica glass tube 4 and the dummy silica tube 10. Then, an optical-fiber core rod 5 (with a size of $\phi 42$ mm×1500 mm, which is bent by a flame process) manufactured by a VAD method was inserted up to the jointed portion of the optical-fiber silica glass tube 4 and the dummy member 13.

Subsequently, the silica tube 11 for fixing the optical-fiber core rod 5 was inserted into the dummy silica tube 10 and a vacuuming cap 12 was disposed at the end of the dummy silica tube 10.

Thereafter, the optical-fiber silica glass tube 4 was disposed in a drawing furnace tower not shown in the figures (see FIG. 1). Three carbon sheets 20, 21, and 23 (with a thickness of 0.6 mm) were used as the seal members for sealing the gap between the muffle tube 2 and the optical fiber preform F. The slit-less carbon sheets 20 and 23 (with an inner diameter of φ156 mm) having the shape shown in FIG. 3A were disposed on and under the slit-formed carbon sheet 21 (with an inner diameter of φ144.5 mm and 72 slits) having the shape shown in FIG. 3B so as to overlap with the slit-formed carbon sheet 21. In a state where the end of the optical fiber preform F was inserted into the drawing furnace 3 before the drawing, the oxygen concentration just beneath the carbon sheets of the seal mechanism S (just beneath the slit-less carbon sheet 20 as the lower seal member indicated by point A in FIG. 1), that is, at an end (upper end) of the furnace space 31 (see FIG. 1) close to the seal members was measured. As a result, it was confirmed that the oxygen concentration was 70 ppm, which is a sufficiently low value, and the sealing ability between the optical fiber preform F and the drawing furnace 3 was satisfactory.

Thereafter, the drawing was carried out while heating the drawing furnace 3 with a heater 1. During the drawing, the space in the optical-fiber silica glass tube 4 was depressurized with a vacuum pump (not shown in the figures) up to −0.1 MPa (gauge pressure) in terms of a display of a Bourdon-tube pressure meter. The oxygen concentration at the same position as described above was measured. As shown in FIG. 2B, when the optical-fiber silica glass tube 4 was inserted into the seal mechanism S, the oxygen concentration was in the range of 80 to 90 ppm. As shown in FIG. 2C, when the dummy silica tube 10 was inserted into the seal mechanism S, the oxygen concentration was in the range of 60 to 80 ppm. From this measurement result, it was confirmed that the sealing ability was satisfactory. During the drawing, no breaking was observed in the fiber. During the drawing, the variation in fiber diameter measured online was stabilized at 125±0.1 μm, which is excellent. When the appearance of the carbon components after the end of the drawing was observed, no degradation was observed and the appearance was excellent.

Example 2

A dummy silica tube 10 with an outer diameter of φ180 mm, an inner diameter of φ100 mm, and a length of 800 mm was jointed by an $H_2/O_2$ burner to an end of an optical-fiber silica glass tube 4 with an outer diameter of φ190 mm, an inner diameter of φ55 mm, and a length of 1500 mm. An optical-fiber core rod 5 (with a size of φ52 mm×1500 mm, which is bent by a flame process) was inserted into the optical-fiber silica glass tube 4 to which the dummy silica tube 10 was jointed in the same way as Example 1. Three carbon sheets 20, 21, and 23 (with a thickness of 0.6 mm) were used as the seal members for sealing the gap between the muffle tube 2 and the optical fiber preform F.

The slit-less carbon sheets 20 and 23 (with an inner diameter of φ191 mm) having the shape shown in FIG. 3A were disposed on and under the slit-formed carbon sheet 21 (with an inner diameter of φ179.5 mm and 72 slits) having the shape shown in FIG. 3B so as to overlap the slit-formed carbon sheet 21.

Similarly to Example 1, the oxygen concentration just beneath the slit-formed carbon sheet 21 before the drawing was measured. As a result, it was confirmed that the oxygen concentration was 80 ppm, which is a sufficiently low value, and the sealing ability between the optical fiber preform F and the drawing furnace 3 was satisfactory. Similarly to Example 1, the oxygen concentration during the drawing was measured. As shown FIG. 2B, when the optical-fiber silica glass tube 4 was inserted into the seal mechanism S, the oxygen concentration was in the range of 80 to 100 ppm. As shown in FIG. 2C, when the dummy silica tube 10 was inserted into the seal mechanism S, the oxygen concentration was in the range of 70 to 100 ppm. From this measurement result, it was confirmed that the sealing ability was satisfactory. During the drawing, no breaking was observed in the fiber. During the drawing, the variation in fiber diameter measured online was stabilized at 125±0.1 μm, which is excellent. When the appearance of the carbon components after the end of the drawing was observed, no degradation was observed and the appearance was excellent.

Example 3

The drawing was carried out by the same method as Example 1, except that the slit-formed carbon sheet 21 having the shape shown in FIG. 3B and having 36 slits in total was used.

Similarly to Example 1, the oxygen concentration just beneath the slit-formed carbon sheet 21 before the drawing was measured. As a result, it was confirmed that the oxygen concentration was 120 ppm, which is a sufficiently low value, and the sealing ability between the optical fiber preform F and the drawing furnace 3 was satisfactory.

Similarly to Example 1, the oxygen concentration during the drawing was measured. As shown FIG. 2B, when the optical-fiber silica glass tube 4 was inserted into the seal mechanism S, the oxygen concentration was in the range of 110 to 140 ppm. As shown in FIG. 2C, when the dummy silica tube 10 was inserted into the seal mechanism S, the oxygen concentration was in the range of 100 to 120 ppm. From this measurement result, it was confirmed that the sealing ability was satisfactory. During the drawing, no breaking was observed in the fiber. During the drawing, the variation in fiber diameter measured online was stabilized at 125±0.1 μm, which is excellent. As the observation result of the appearance of the carbon components after the end of the drawing, no degradation was observed and the appearance was excellent.

Example 4

The drawing was carried out by the same method as Example 1, except that an optical-fiber silica glass tube 4 with an outer diameter of φ155 mm and an inner diameter of φ45 mm and a dummy silica tube 10 with an outer diameter of φ150 mm and an inner diameter of φ80 mm were used and a slit-formed carbon sheet 21 (with an inner diameter of φ149.5 mm and 18 slits) having the shape shown in FIG. 3B and two slit-less carbon sheets 20 and 23 (with an inner diameter of φ156 mm) having the shape shown in FIG. 3A were used.

Similarly to Example 1, the oxygen concentration just beneath the slit-formed carbon sheet 21 before the drawing was measured. As a result, it was confirmed that the oxygen concentration was 90 ppm, which is a sufficiently low value, and the sealing ability between the optical fiber preform F and the drawing furnace 3 was satisfactory. Similarly to Example 1, the oxygen concentration during the drawing was measured. As shown FIG. 2B, when the optical-fiber silica glass tube 4 was inserted into the seal mechanism S, the oxygen concentration was in the range of 80 to 110 ppm. As shown in FIG. 2C, when the dummy silica tube 10 was inserted into the seal mechanism S, the oxygen concentration was in the range of 90 to 100 ppm, which provided the satisfactory sealing ability. From these measurement results, it was confirmed that the sealing ability was satisfactory. During the drawing, no breaking was observed in the fiber. During the drawing, the variation in fiber diameter measured on-line was stabilized at 125±0.1 μm, which is excellent. When the appearance of the carbon components after the end of the drawing was observed, no degradation was observed and the appearance was excellent.

Example 5

The drawing was carried out by the same method as Example 1, except that a slit-formed carbon sheet 21 having the shape shown in FIG. 3B and having an inner diameter of ϕ145.0 mm and 72 slits was used.

Similarly to Example 1, the oxygen concentration just beneath the slit-formed carbon sheet 21 before the drawing was measured. As a result, it was confirmed that the oxygen concentration was 130 ppm, which is a sufficiently low value, and the sealing ability between the optical fiber preform F and the drawing furnace 3 was satisfactory.

Similarly to Example 1, the oxygen concentration during the drawing was measured. As shown FIG. 2B, when the optical-fiber silica glass tube 4 was inserted into the seal mechanism S, the oxygen concentration was in the range of 120 to 140 ppm. As shown in FIG. 2C, when the dummy silica tube 10 was inserted into the seal mechanism S, the oxygen concentration was in the range of 160 to 180 ppm. From these measurement results, it was confirmed that the sealing ability was satisfactory. During the drawing, no breaking was observed in the fiber. During the drawing, the variation in fiber diameter measured online was stabilized at 125±0.1 μm, which is excellent. When the appearance of the carbon components after the end of the drawing was observed, no degradation was observed and the appearance was excellent.

Example 6

The drawing was carried out by the same method as Example 1, except that a slit-formed carbon sheet 21 having the shape shown in FIG. 3B and having an inner diameter of ϕ145.5 mm and 72 slits was used.

Similarly to Example 1, the oxygen concentration just beneath the slit-formed carbon sheet 21 before the drawing was measured. As a result, it was confirmed that the oxygen concentration was 140 ppm, which is a sufficiently low value, and the sealing ability between the optical fiber preform F and the drawing furnace 3 was satisfactory. Similarly to Example 1, the oxygen concentration during the drawing was measured. As shown FIG. 2B, when the optical-fiber silica glass tube 4 was inserted into the seal mechanism S, the oxygen concentration was in the range of 130 to 150 ppm. As shown in FIG. 2C, when the dummy silica tube 10 was inserted into the seal mechanism S, the oxygen concentration was in the range of 190 to 210 ppm. From these measurement results, it was confirmed that the sealing ability was satisfactory. During the drawing, no breaking was observed in the fiber. During the drawing, the variation in fiber diameter measured online was stabilized at 125±0.15 μm, which is excellent. When the appearance of the carbon components after the end of the drawing was observed, no degradation was observed and the appearance was excellent.

Comparative Example 1

The drawing was carried out by the same method as Example 1, except that a slit-less carbon sheet 20 (with an inner diameter of ϕ156 mm) having the shape shown in FIG. 3A was used as a seal member.

The oxygen concentration before the drawing and the oxygen concentration when the optical-fiber silica glass tube 4 was inserted into the seal mechanism S (see FIG. 2B) during the drawing, which were measured similarly to Example 1, were in the range of 130 to 150 ppm, whereby the sealing ability was satisfactory. During the first half of the drawing, the fiber diameter was stabilized at 125±0.1 μm. However, as shown in FIG. 2C, when the dummy silica tube 10 was inserted into the seal mechanism S, the oxygen concentration was 250 to 300 ppm, which means that the sealing ability was poor. Immediately after the sealing ability was degraded, the variation in fiber diameter became great and the variation in diameter was 125±0.35 μm, which is unstable.

When the appearance of the carbon components after the end of the drawing was observed, the inner face of the muffle tube 2 was discolored and a part thereof was burned out.

Comparative Example 2

The drawing was carried out by the same method as Example 1, except that only a carbon sheet 22 (with an inner diameter of ϕ154.5 mm and 36 slits) having the shape shown in FIG. 3C was used as a seal member.

The oxygen concentration before the drawing and the oxygen concentration when the optical-fiber silica glass tube 4 was inserted into the seal mechanism S (see FIG. 2B) during the drawing, which were measured similarly to Example 1, were in the range of 70 to 90 ppm, whereby the sealing ability was satisfactory. During the first half of the drawing, the fiber diameter was stabilized at 125±0.1 μm. However, as shown in FIG. 2C, when the dummy silica tube 10 was inserted into the seal mechanism S, the oxygen concentration was 200 to 230 ppm, which means that the sealing ability was poor. Immediately after the sealing ability was degraded, the variation in fiber diameter became great and the variation in fiber diameter was 125±0.3 μm, which is unstable. When the appearance of the carbon components after the end of the drawing was observed, the inner face of the muffle tube 2 was discolored and a part thereof was burned out.

Comparative Example 3

The drawing was carried out by the same method as Example 1, except that an optical-fiber silica glass tube 4 with an outer diameter of ϕ148 mm and an inner diameter of ϕ45 mm and a dummy silica tube 10 with an outer diameter of ϕ145 mm and an inner diameter of ϕ80 mm were used and only a carbon sheet 22 (with an inner diameter of ϕ144.5 mm and 36 slits) having the shape shown in FIG. 3C was used as a seal member.

The oxygen concentration before the drawing, which was measured similarly to Example 1, was in the range of 60 to 80 ppm, whereby the sealing ability is satisfactory. However, at which a drawing length reached 200 km, the oxygen concentration was 250 ppm, which means that the sealing ability was suddenly degraded. Therefore, the drawing was stopped. When the appearance of the carbon sheet 22 after cooling the furnace was observed, portions between the slits of the inner circumference edge 22A of the carbon sheet 22 were missing as though worn away.

Figure 7:
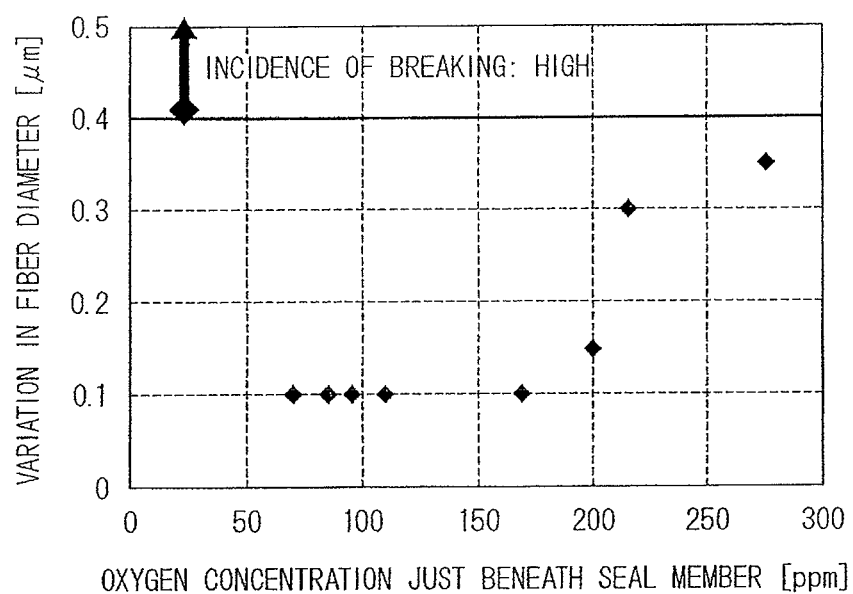
FIG. 7 is a graph showing a relationship between the oxygen concentration just beneath a seal member and variations in fiber diameter.

The test results of the examples according to the present invention and the comparative examples are shown in Table 1 and the graph of FIG. 7.

As can be seen from Table 1 and the graph in FIG. 7, in Examples 1 to 5 of the present invention, the oxygen concentration in the furnace was suppressed to 200 ppm or less and the variation in fiber diameter was suppressed to the range of 125±0.1 μm, except that the variation in fiber diameter was slightly high in Example 6. As a result, according to the present invention, it was confirmed that the variation in fiber diameter during the drawing could be suppressed to be within a predetermined range.

On the other hand, in Comparative Examples 1 to 3, the oxygen concentration in the furnace was 200 ppm or higher and the variation in fiber diameter was higher than those in Examples 1 to 5. Particularly, in Comparative Example 3, fiber breaking was generated due to the degradation in sealing ability. As shown in the graph of FIG. 7, when the variation in fiber diameter is equal to or greater than 0.4 μm, the incidence of breaking increases.

TABLE 1

|  | Oxygen concentration (average) | | | Variation |
| --- | --- | --- | --- | --- |
|  | At setting | Silica glass tube | Dummy tube | in fiber diameter |
| Example 1 | 70 | 85 | 70 | 0.1 |
| Example 2 | 80 | 90 | 85 | 0.1 |
| Example 3 | 120 | 125 | 110 | 0.1 |
| Example 4 | 90 | 95 | 95 | 0.1 |
| Example 5 | 130 | 130 | 170 | 0.1 |
| Example 6 | 140 | 140 | 200 | 0.15 |
| Comparative Example 1 | 140 |  | 275 | 0.35 |
| Comparative Example 2 | 80 |  | 215 | 0.3 |
| Comparative Example 3 | 70 |  | 250 | Breaking |

As described in detail above, in the optical fiber manufacturing apparatus and the optical fiber manufacturing method according to the embodiment of the present invention, the slit-formed carbon sheet 21 having an annular shape into which the optical fiber preform F is inserted and having the inner-circumference slits 25 and the outer-circumference slits 26 is employed as the seal member disposed at an end (upper end) of the furnace space 31 of the drawing furnace 3 and contacting with the outer circumference of the optical fiber preform F inserted into the furnace space 31 to seal the gap between the drawing furnace 3 and the optical fiber preform F. Accordingly, when the optical fiber preform F having an outer diameter greater than the inner diameter of the opening 21M of the slit-formed carbon sheet 21 is inserted, the seal pieces 25A between the inner-circumference slits 25 are deformed to move up and down and the seal pieces 25A thus comes in close contact with the optical fiber preform F. Since the entire slit-formed carbon sheet 21 can be deformed due to the inner-circumference slits 25 and the outer-circumference slits 26, the stress can be distributed in the slit-formed carbon sheet 21, thereby suppressing the destruction of the carbon sheet due to local stress concentration.

That is, when the optical fiber preform F having an outer diameter greater than the inner diameter of the opening 21M of the slit-formed carbon sheet 21 is inserted into the opening 21M, the seal pieces 25A between the inner-circumference slits 25 are deformed to come in close contact with the optical fiber preform F. Accordingly, it is possible to maintain the sealing ability of the slit-formed carbon sheet 21 in between the drawing furnace 3 and the optical fiber preform F without destroying the seal member.

When the inner diameter of the opening 21M of the slit-formed carbon sheet 21 is smaller than the minimum diameter of the optical fiber preform F, the seal pieces 25A and 26A between the adjacent slits 25 and 26 always come in close contact with the optical fiber preform F. Accordingly, during the drawing, it is possible to continuously maintain the sealing ability between the drawing furnace 3 and the optical fiber preform F, which is advantageous for stably securing the sealing performance.

Since the slit-formed carbon sheet 21 has a high degree of freedom in deformation due to the slits 25 and 26, it can easily come in close contact with the optical fiber preform F. Accordingly, when the outer diameter of the optical fiber preform F varies with the drawing and when the difference in outer diameter exists between the optical-fiber silica glass tube 4 and the dummy silica tube 10, the slit-formed carbon sheet 21 cannot cause a gap from the optical fiber preform F but can satisfactorily maintain the sealing ability for the optical fiber preform F. Accordingly, it is possible to prevent the intrusion of ambient air and to suppress the oxygen concentration in the drawing furnace 3 (the oxygen concentration at an end of the furnace space 31 close to the seal member) to 200 ppm or less. As a result, it is possible to stabilize the fiber diameter, to prevent the degradation of the muffle tube 2 or the heater 1 made of carbon in the drawing furnace 3, and to extend the lifetime thereof. Accordingly, the drawing of the optical fiber preform F in the state where the oxygen concentration in the drawing furnace 3 is kept to 100 ppm or less is easily achieved.

The slits 25 and 26 of the slit-formed carbon sheet 21 are arranged in the radial direction of the slit-formed carbon sheet 21 and are alternately arranged in the circumferential direction of the slit-formed carbon sheet 21. Accordingly, when the optical fiber preform F having an outer diameter greater than the inner diameter of the opening 21M is inserted into the opening 21M of the slit-formed carbon sheet 21, the entire slit-formed carbon sheet 21 can be deformed due to the slits 25 and 26 so as to effectively relax the strain in the seal member. As a result, it is possible to prevent the destruction of the slit-formed carbon sheet 21.

Since the carbon sheet is employed as the seal member of the optical fiber manufacturing apparatus, it is possible to obtain a high heat resistance in the seal member and a high sealing ability between the drawing furnace 3 and the optical fiber preform F during the drawing.

Like the optical fiber manufacturing apparatus 100 shown in FIG. 1 and FIGS. 2A and 2C, when the seal mechanism S is employed in which the slit-less carbon sheets 20 and 23 are disposed so as to be coaxial with the slit-formed carbon sheet 21 having the slits 25 and 26 and to have a gap in the axis direction (the direction of arrow a-b), it is possible to maintain the high sealing ability between the drawing furnace 3 and the optical fiber preform F at the time of the drawing due to the carbon sheets 20, 21, and 23 of the seal mechanism. Accordingly, it is possible to prevent the intrusion of ambient air and to further reliably suppress the oxygen concentration in the drawing furnace 3 (the oxygen concentration at an end of the furnace space 31 close to the seal member) to 200 ppm or less. As a result, it is possible to stabilize the fiber diameter. It is possible to more easily suppress the oxygen concentration in the drawing furnace 3 to 100 ppm or less.

In the above-mentioned embodiment, the carbon sheets 20, 21, and 23 are used as the seal member of the seal mechanism S, but the present invention is not limited thereto. A seal member made of another material having excellent heat resistance and flexibility may be used.

Although the embodiments of the present invention have been described in detail with reference to the drawings, the present invention is not limited to the embodiment and may include changes in design without departing from the spirit and scope of the present invention.

In other words, while a preferred embodiment of the present invention has been described and illustrated above, it should be understood that this is exemplary of the present invention and is not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An optical fiber manufacturing apparatus for manufacturing an optical fiber by drawing an optical fiber preform, comprising:
   a drawing furnace having therein a muffle tube into which the optical fiber preform is inserted and heating the optical fiber preform; and
   a first seal member which is disposed at an insert side of the drawing furnace so as to be coaxial with the drawing furnace and which seals the optical fiber preform inserted into an opening formed at the center thereof, wherein
   the first seal member includes a plurality of inner-circumference slits formed in the inner circumference thereof and a plurality of outer-circumference slits formed in the outer circumference thereof and is configured such that an inner circumferential edge of the first seal member is elastically urged to the optical fiber preform while being deformed downwardly in the insertion direction of the optical fiber preform,
   the inner-circumference slits and the outer-circumference slits of the first seal member are formed along radial directions of the opening into which the optical fiber preform is inserted,
   the inner-circumference slits and the outer-circumference slits are alternately arranged in a circumferential direction of the first seal member, and
   the first seal member is formed from a single sheet.

2. The optical fiber manufacturing apparatus according to claim 1, wherein the first seal member consists of a carbon sheet.

3. The optical fiber manufacturing apparatus according to claim 1, further comprising a second seal member having an opening at the center thereof, being disposed to be coaxial with the first seal member, and having no slit.

4. The optical fiber manufacturing apparatus according to claim 3, wherein:
   a plurality of the second seal members are provided; and
   the first seal member is disposed between the second seal members separated from each other in the axis direction of the muffle tube.

5. The optical fiber manufacturing apparatus according to claim 3, wherein the inner diameter of the opening of the second seal member is larger than the maximum diameter of the optical fiber preform.

6. The optical fiber manufacturing apparatus according to claim 1, wherein the inner diameter of the opening of the first seal member is smaller than the minimum diameter of the optical fiber preform.

* * * * *